United States Patent [19]

Wolfgang et al.

[11] Patent Number: 5,000,495

[45] Date of Patent: Mar. 19, 1991

[54] LATCH MECHANISM, COMPONENTS THEREOF AND PROCESS OF MANUFACTURE FOR COMPONENTS THEREOF

[75] Inventors: Thau Wolfgang, Aurora; Andrzej Bartczak, Newmarket, both of Canada

[73] Assignee: KTM Locks, CMT Group, Division of Magna International, Inc., Newmarket, Canada

[21] Appl. No.: 197,300

[22] Filed: May 23, 1988

[30] Foreign Application Priority Data

Mar. 11, 1988 [CA] Canada ................................. 561213

[51] Int. Cl.$^5$ .............................................. E05C 3/26
[52] U.S. Cl. ................................................... 292/216
[58] Field of Search ............... 292/DIG. 26, 216, 280, 292/DIG. 27, 336.3, 48, 337, 201

[56] References Cited

U.S. PATENT DOCUMENTS

| | | | |
|---|---|---|---|
| 2,700,290 | 1/1955 | Dall | 292/216 X |
| 3,608,941 | 9/1971 | Kondo et al. | 292/DIG. 26 X |
| 3,614,146 | 10/1971 | Marx | 292/DIG. 26 X |
| 4,358,141 | 11/1982 | Hamada | 292/216 |
| 4,538,845 | 9/1985 | Yamada | 292/216 |
| 4,735,447 | 4/1988 | Kleefeldt | 292/201 X |

*Primary Examiner*—Richard E. Moore
*Attorney, Agent, or Firm*—Neil H. Hughes; Ivor M. Hughes

[57] ABSTRACT

An improved latch mechanism, components therefor and processes of manufacture of the components are disclosed. The improved latch mechanism comprises a ratchet, pawl, at least one release lever for releasing the pawl for releasing the ratchet and a locking lever for precluding the at least one release lever from releasing the pawl, the pivot point of the pawl and the at least one release lever being the same. The ratchet and pawl may abut one another along the center line of the striker receiving opening in a latch housing when the ratchet is in its locked position. A child proof safety lever is disclosed as is a one-piece method of manufacturing plastic housing carrying soft silencers, noise reducers, sealing portions and bumpers.

23 Claims, 13 Drawing Sheets

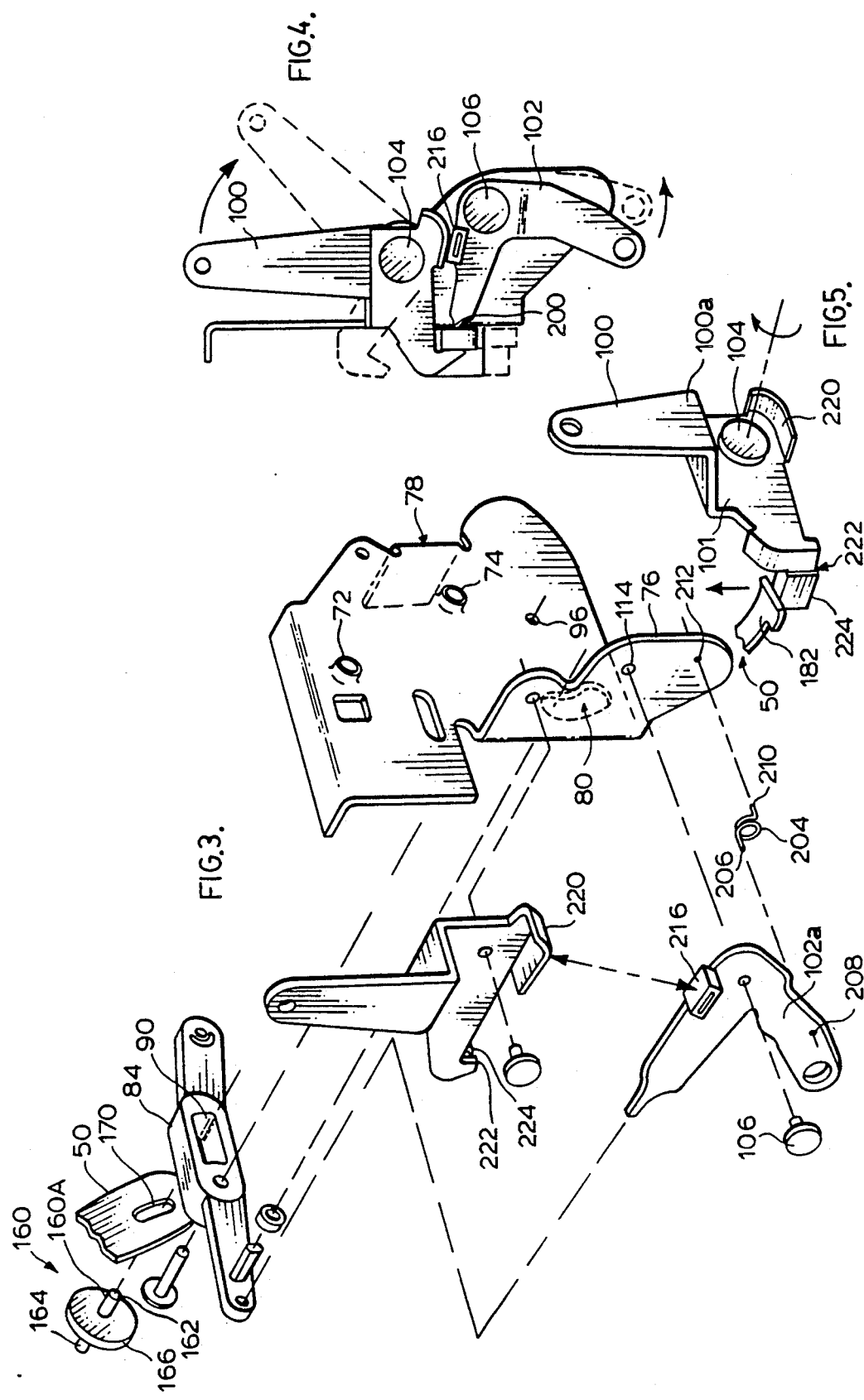

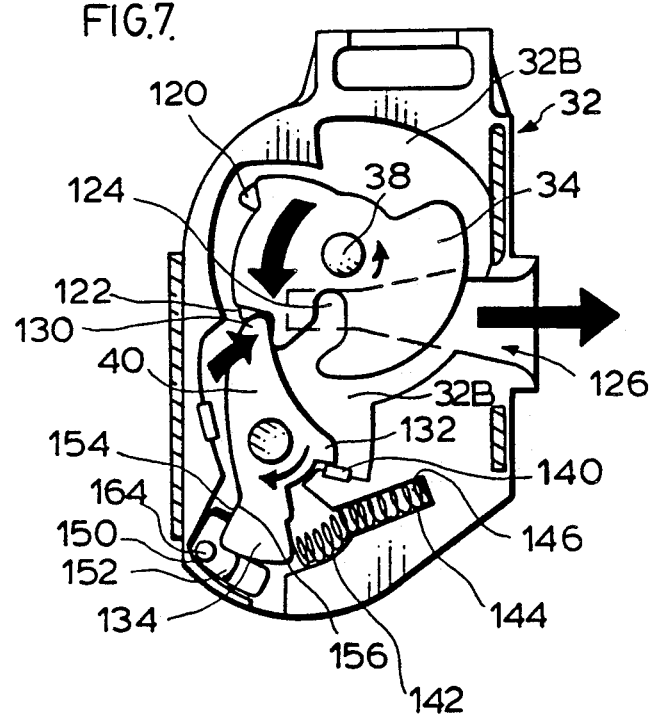
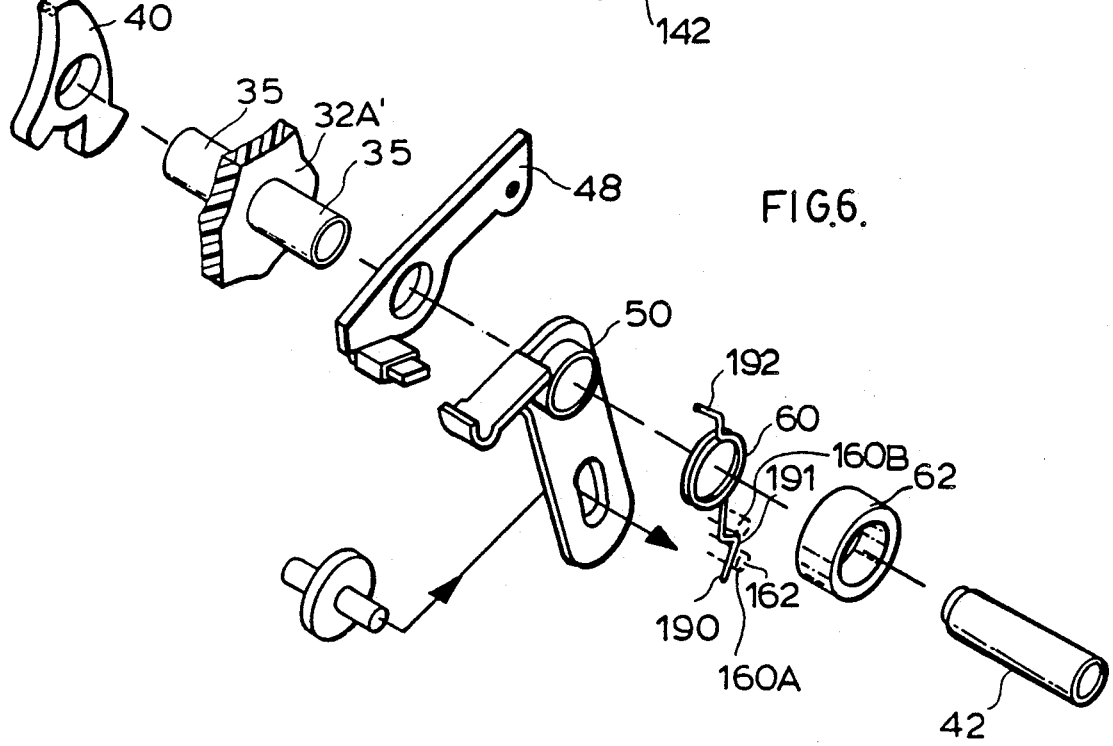

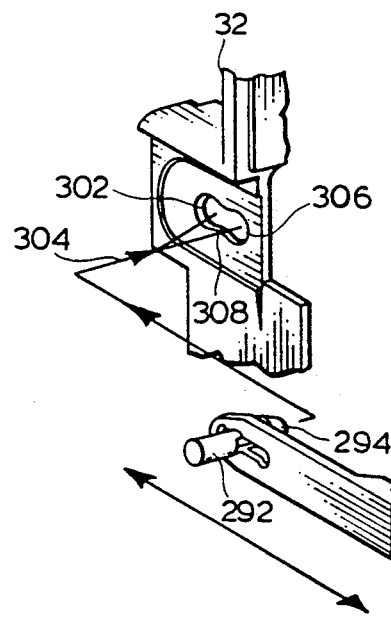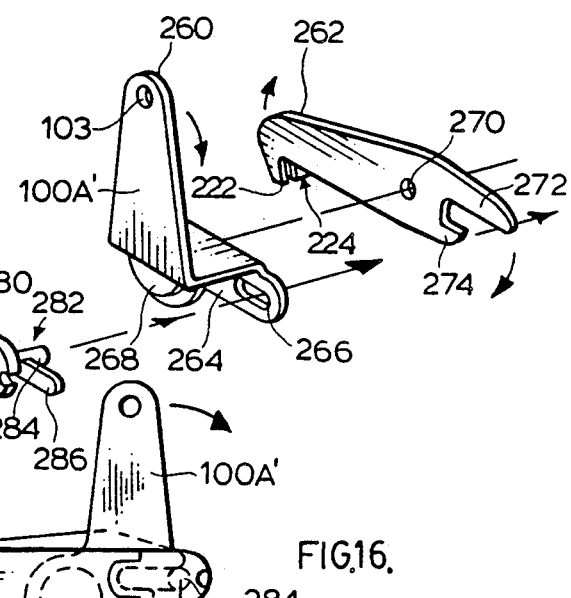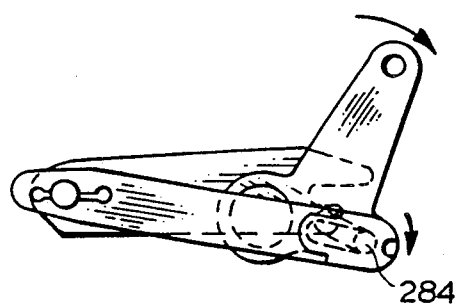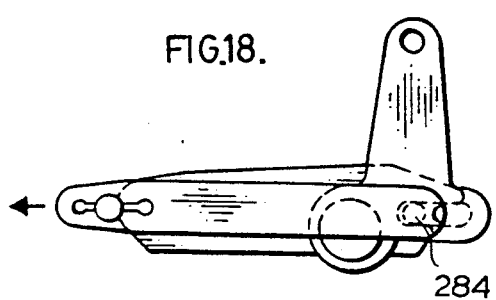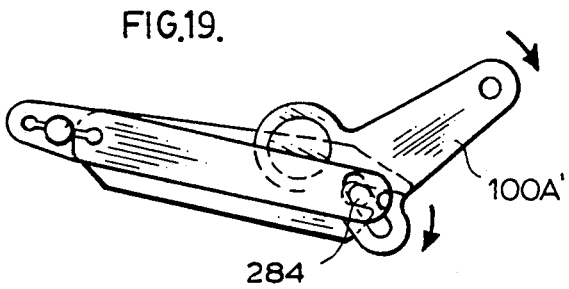

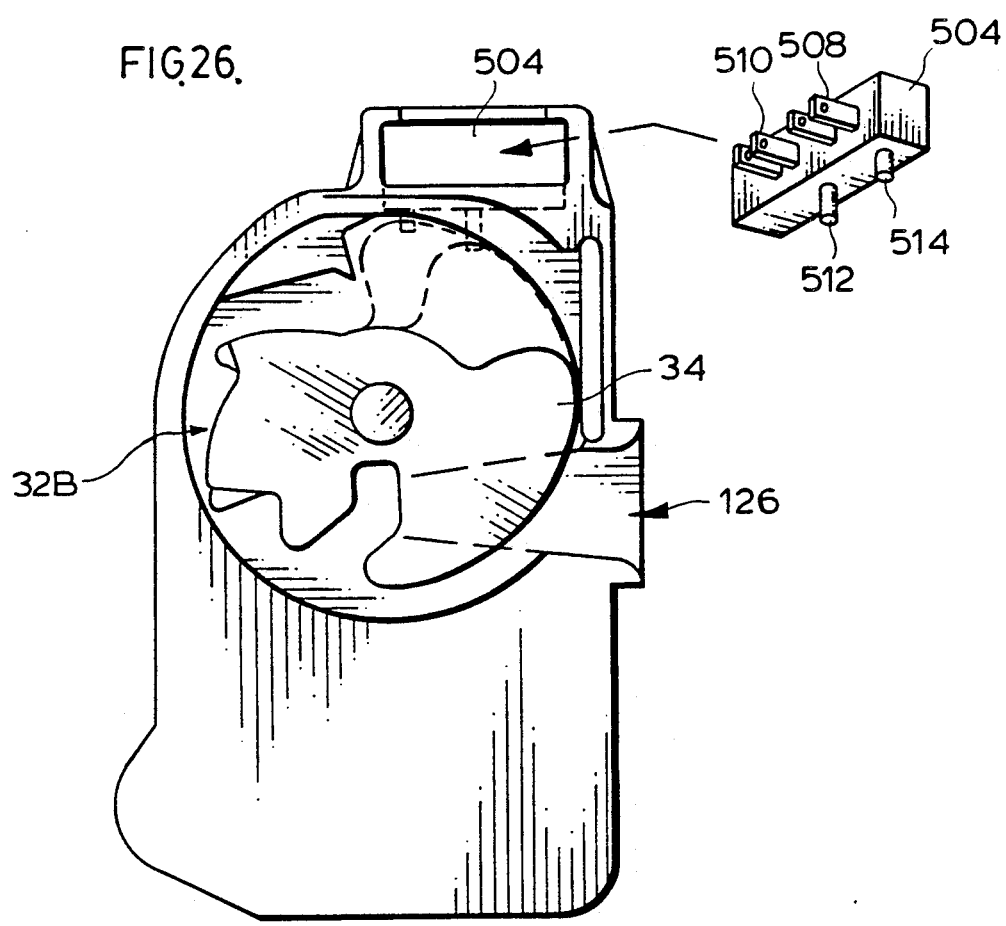

LATCH MECHANISM, COMPONENTS THEREOF AND PROCESS OF MANUFACTURE FOR COMPONENTS THEREOF

FIELD OF INVENTION

This invention relates to improved latch mechanisms and components therefore. The latch mechanisms are suitable for use on vehicle doors for securing the door to a "B" or "C"-Pillar.

BACKGROUND OF INVENTION

Many latch mechanism proposals have been made for securing vehicular doors to the "B" or "C"-Pillars. (Two of such proposals include those shown in U.S. Pat. Nos. 4,358,141 and 4,538,845.) Latch mechanism proposals normally include:

(a) a resiliently biased ratchet carrying a recess for receiving a striker (carried by the "B" or "C"-Pillar), the ratchet pivotable from an open position for receiving the striker to a closed position for locking the door to the "B" or "C"-Pillar, (b) a pawl for locking the ratchet in a locked position, (c) a release lever for releasing the pawl for releasing the ratchet to pivot to the open position (by for example lifting the inside or outside release handle) and (d) a locking lever for precluding a release lever from releasing the pawl.

The latch mechanism may comprise a child safety mechanism to preclude operation of the inside handle when the child safety mechanism is activated.

Because of the downsizing of cars, collisions of the smaller vehicles with other vehicles may have greater structural deformation of the component parts making up these vehicles, than the larger ones and more serious consequences may result. In some instances, the latch mechanism securing the door to the striker detaches from the striker and the door opens.

It is therefore an object of this invention to provide an improved latch mechanism and components therefor.

It is a further object of the invention to provide a latch mechanism which has enhanced safety characteristics should an accident occur.

It is a further object of the invention to provide an improved child safety mechanism for incorporating into a latch mechanism.

It is still a further object of the invention to provide a quieter latch mechanism and housing and simple process for manufacturing the quieter latch mechanism and housing.

It is a further object of the invention to provide a latch mechanism of such construction and configuration to minimize dirt and dust penetration into the latch mechanism.

It is a further object of this invention to provide an improved latch mechanism which may be adapted for use with a power actuator with minimum complexity in the connection and use thereof.

Further and other objects of the invention will be realized by those skilled in the art from the following summary of the invention and detailed description of embodiments thereof.

SUMMARY OF INVENTION

According to one aspect of the invention, an improved latch mechanism is provided, the latch mechanism comprising (a) a ratchet carrying a recess for receiving a striker, the ratchet pivotable from an open position for receiving the striker to a closed position (b) a pawl for locking the ratchet in the closed (locked) position (c) at least one release lever and at least one intermediate lever between the at least one release lever and pawl for actuating the pawl for releasing the ratchet to pivot to the open position or at least two release levers comprising an outside handle release lever and inside handle release lever and (d) a locking lever for precluding the at least one release lever from releasing the pawl, the improvement comprising the pivot point of the pawl and the at least one release lever and immediate lever or the pawl and outside handle release lever and inside handle release lever, as the case may be, being the same.

In this regard, in one embodiment, the pivot for the pawl may comprise a bushing or pin and the pivot (bushing or pin) also carries the at least one release lever. Therefore in an accident where there has been deformation of the latch, because the at least one release lever is on the same pivot point as the pawl (and therefore moves with the pawl), it may still be possible to open the latch mechanism.

Preferably both the outside handle release lever and inside handle release lever all pivot on the same common pivot as the pawl. Preferably any intermediate levers operatively engaging or connected to the at least one release lever are also connected to the same pivot as the pawl and at least one release lever.

Where the inside handle release lever or outside handle release is not on a common pivot they may be positively connected together (for example a hook attached to one lever connecting with a hook attached to another lever or a hook of one lever passing through the eye (loop) secured to a bolt or pin on another lever).

According to another aspect of the invention, an improved latch mechanism is provided, the latch mechanism comprising (a) a ratchet carrying a recess for receiving a striker, the ratchet pivotable from an open position for receiving the striker to a closed position locking the striker;

(b) a pawl for locking the ratchet in the closed (locked) position;

(c) at least one release lever for releasing the pawl for releasing the ratchet to pivot to the open position (d) a locking device (for example, locking lever) for precluding the at least one release lever from releasing the pawl; and (e) a pin moveable by the locking device (in for example a slot in the housing) from a position whereat the pin can engage the pawl for releasing the ratchet to a position whereat movement (for example, pivoting) of the pin will not engage the pawl to pivot the pawl for releasing the ratchet. Thus the moveable pin when appropriately positioned acts directly on the pawl.

According to another aspect of the invention, an improved latch mechanism is provided, the latch mechanism comprising:

(a) a latch housing for mounting a ratchet and pawl having two ends, one end closer the ratchet and the other end remote from the ratchet, the latch housing carrying a striker receiving opening in the housing and a slot having a predetermined shape (for example, in the height and width of the slot) proximate the end of the pawl remote the ratchet;

(b) the ratchet carrying a recess for receiving the striker, the ratchet pivotable from an open position for receiving the striker to a closed position, locking the striker;

(c) a pawl for locking the ratchet in the closed (locked) position;

(d) at least one release lever for releasing the pawl for releasing the ratchet to pivot to the open position;

(e) a locking device (for example, locking lever) for precluding the at least one release lever from releasing the pawl, in one embodiment, the locking lever carrying one end of a pin;

(f) a pin (for example, a "guided floating pin", the two ends of which are spaced by a spacer) moveable for example, by the locking device (in one embodiment carried by the locking lever) in the slot having the predetermined shape (for example, in the height and width of the slot), for example a modified U-shape [sideways U-shaped]) in the housing, from a position whereat the pin can engage the pawl for releasing the ratchet to a position whereat movement (for example, pivoting) of the pin will not engage the pawl to pivot the pawl for releasing the ratchet. In one embodiment the two ends of the pin are spaced by a spacer.

According to another aspect of the invention, an improved latch mechanism is provided, the latch mechanism comprising:

(a) a latch housing for mounting a ratchet and pawl and carrying a striker receiving opening in the housing and a slot having a predetermined shape (for example, in the height and width; for example a modified U-shape [sideways U-shape]) in the housing;

(b) the ratchet carrying a recess for receiving the striker, the ratchet pivotable from an open position for receiving the striker to a closed position, locking the striker;

(c) a pawl for locking the ratchet in the closed position (locked position), the end of the pawl remote the ratchet overlying a portion of the slot in the housing;

(d) at least one release lever for releasing the pawl for releasing the ratchet to pivot to the open position;

(e) a pivotable intermediate lever operatively engageable by the release lever to cause the intermediate lever to pivot, the intermediate lever carrying a slot permitting a pin to ride therein from one position in the slot to another, the slot overlying a portion of the slot in the housing;

(f) a locking device (for example, locking lever) for precluding the at least one release lever from releasing the pawl, the locking lever carrying one end of a pin;

(g) a pin (for example, a "guided floating pin"), one end of which is carried by a locking device and the other end passes through the slot in the intermediate lever through the slot in the housing to a position in the same plane as the pawl to engage the pawl, (the two ends of the pin in one embodiment being spaced by a spacer), the pin moveable in the slot by the locking lever from a position whereat movement of the release lever causes the intermediate lever to pivot the pin to engage the pawl releasing the ratchet to a position whereat pivoting of the pin in the intermediate lever will not engage the pawl to pivot the pawl for releasing the ratchet.

According to another aspect of the invention, an improved latch mechanism comprises:

(a) a housing comprising a wall carrying an elongated slot in the shape of an hourglass having two wider portions spaced by a narrower portion;

(b) a ratchet carrying a recess for receiving a striker, the ratchet pivotable from an open position for receiving the stiker to closed position;

(c) a pawl for locking the ratchet in the closed (locked) position;

(d) at least one release lever for releasing the pawl for releasing the ratchet to pivot to the open position, the release lever comprising two portions pivotally secured together, one portion of the release lever for being connected to the inside release handle and carrying an elongated slot extending generally in the same direction as the hourglass shaped slot and the other portion for releasing the pawl and carrying at least one arm (preferably a pair of arms and a space therebetween [preferably one arm being shorter than the other arm]); and (e) a child proof safety lever carrying proximate one end, a pin for extending through the slot in the portion of the release lever for being connected to the inside release handle and for extending proximate the at least one arm of the other portion and proximate the other end of the child proof safety lever a resilient compressible projection (preferably comrpising a pair of spaced fingers compressible towards one another) for seating in the hourglass shaped slot [preferably carrying enlarged resilient portions or other stop means on the ends of the fingers to secure the fingers through the hourglass shaped slot, for example by engaging housing material surrounding the hourglass shaped slot on the other side of the slot], the child proof safety lever further comprising means (for example, a handle projection) extending therefrom for being used to activate the child proof lever, whereby when the projection is at one end of the hourglass shaped slot it is retained there and the pin extending through the slots is aligned with the at least one arm (and preferably between the arms), operatively connecting the portions of the release lever permitting the release lever to release the pawl and when the projection is moved past the narrower portion of the hourglass shaped slot into the wider portion at the other end, it is retained there and the pin extending through the slot is not aligned with the at least one arm and does not operatively connect the portions of the release lever to permit release of the pawl.

According to another aspect of the invention an improved latch mechanism is provided, the latch mechanism comprising (a) a latch housing for mounting a ratchet and pawl and carrying a striker receiving opening in the housing;

(b) the ratchet being pivotably mounted and carrying a recess for receiving the striker, the ratchet pivotable from an open position with the recess aligned with the striker receiving opening in the housing for receiving the striker to a closed position with the recess spaced from the striker receiving opening;

(c) a pawl pivotably mounted for locking the ratchet in the closed (locked) position, the ratchet carrying a shoulder (or other stop) on the ratchet proximate the recess for being engaged by the pawl proximate the centreline of the striker receiving opening when the ratchet is in the closed (locked) position, the shoulder or stop being on the side of the recess remote the striker receiving opening in the housing, the shoulder when urged by the ratchet attempting to rotate to position the recess in alignment with the striker receiving opening to release the striker without normal activation of the pawl (by for example releasing a release lever to release the pawl as when opening a door), as for example in an accident, the shoulder rotates pushing itself onto the pawl urging the pawl to rotate towards the striker receiving opening (opposite its normal motion when activated to release the ratchet—the portion normally engaging the ratchet and locking the ratchet in the closed position normally moving away from the striker receiving opening) therefore locking the ratchet more firmly in its closed (locked) position.

Thus a toggle action is set up between the ratchet and pawl for additional safety in accidents. It becomes harder to separate the ratchet from the pawl.

In an embodiment of the invention a second shoulder (or stop) is provided on the ratchet on the side of the first shoulder remote the recess for acting as a back up, being able to engage the pawl before the recess in the ratchet is aligned with the striker receiving opening in the housing.

According to another aspect of the invention, a process of manufacturing a latch mechanism housing is provided, the housing comprising a rigid, tough plastics material of predetermined shape, the housing carrying silencers, noise reducers, sealing portion and/or bumpers of a softer plastics material (for example, "Hytrel" (a t.m. of Dupont)) disposed at predetermined positions on the housing, the process comprising:

(a) injection moulding the housing comprising the rigid tough plastics material in at least a two piece mould (comprising, for example, top and bottom mould or side mould portions);

(b) removing at least one piece of the mould (for example either top, bottom or side) and inserting another mould portion thereon in its place defining the area where the silencers, noise reducers, sealing portions and/or bumpers are to be moulded onto the housing; and (c) injection moulding the silencers, noise reducers, sealing portions and/or bumpers in one step with a softer plastics material using the other mould piece defining the parts to be moulded onto the housing.

In one embodiment the softer plastics is "Hytrel" (t.m. of Dupont). In another embodiment the housing is made with the tougher plastics material Delrin (t.m. of Dupont), an acetal resin.

According to another aspect of the invention, an improved ratchet for a latch mechanism is provided, the ratchet comprising a striker receiving recess, the ratchet carrying on the side of the ratchet closest to the striker receiving opening of a latch mechanism housing when the ratchet is mounted for use in the housing, at least one elongated piece of flexible material (for example, made of "Hytrel" plastics) securely connected to the ratchet for extending into the striker receiving opening and engaging the walls defining the striker receiving opening when the ratchet is pivoted from its open to closed position or released to rapidly move from its closed to open position, for the purposes of sealing the latch mechanism and cleaning debris away from the striker receiving opening. The at least one elongated piece of flexible material may comprise at least two elongated pieces of flexible material spaced from one another along the circumference of the ratchet (for example, to engage one at a time the walls defining the striker receiving opening).

Preferably the at least one elongated piece of flexible material is securely connected to the ratchet by a plastics cover portion injection moulded onto the ratchet.

According to another aspect of the invention, a latch mechanism is provided comprising a housing, cover plate, ratchet, pawl and latch levers, the latch mechanism comprising two chambers separated by a wall, one of the chambers carrying the ratchet and pawl and the other chamber carrying the latch levers, the latch mechanism being mounted to a door in such a manner that the carried is covered by a cover plate proximate latch levers are chambers in which the shut surface of the door (the side where the latch is mounted to engage the striker) and the chamber in which the pawl and ratchet are carried is covered, thereby improving theft resistance, freeze resistance and contamination resistance of the latch mechanism. Therefore, because the levers are mounted at the edge of the latch mechanism (with portions of the levers projecting into the latch housing between the housing and cover plate), a cover plate carrying a minimum number of openings is provided.

According to another aspect of the invention, a combination of a latch mechanism and power actuator is provided, the latch mechanism carrying a mounting or casing for receiving an electrical switch for sensing the operation of the ratchet and/or its position, on the pawl and/or its position, or both, the power actuator carrying an electrical connector for connecting the power actuator to the electrical switch carried in the casing of the latch mechanism (for example where the switch carries at least one electrical contact (for example prong) then the electrical connector comprises a receptacle to which the electrical contact is electrically secured), the power actuator carrying a second electrical connector for being electrically connected to an electrical harness for being connected to the switches (for example, connected to displays to display the status or the latch mechanism—open, ajar, closed, etc.), central locking system and switches of the central locking system (power lock) whereby electrical connection of the latch mechanism switches is made through the power actuation to the electrical harness.

The electrical connections leading from the power actuator to the electrical harness must include the electrical connections made between the latch mechanism and power actuator (and will depend upon the number of functions to be performed or monitored) and the electrical connections from the power actuator (which will also depend upon the number of functions to be performed or monitored). Thus all the connections between the harness and latch mechanism switch run through the power actuator. Thus, only one common wire harness is required for use to control and/or monitor all possible options.

BRIEF DESCRIPTION OF THE DRAWINGS

The invention will now be illustrated with reference to the following drawings in which:

FIG. 3 is an exploded perspective view of the exploded latch mechanism of FIG. 1 illustrating the position of component parts.

FIG. 4 illustrates the connection of component parts shown in FIG. 3 and the operation thereof.

FIG. 5 is a perspective view of the operation of two components shown in FIGS. 4 and 1.

FIG. 6 is an exploded view of some of the components shown in FIGS. 1 and 2 in their relative positions.

FIG. 7 is a plan view of a ratchet and pawl mounted in the latch mechanism according to an embodiment of the invention.

FIG. 15 is a perspective view of some of the components comprising the latch mechanism of FIG. 14.

FIGS. 16 and 17 are plan views of components in FIG. 15 illustrating their movement when the child proof safety lever is used to preclude release of the pawl.

FIGS. 18 and 19 are plan views of components in FIG. 15 illustrating their movement when the child proof safety lever is not used to preclude release of the pawl.

FIG. 26 is a partly disassembled view of the mechanism in FIG. 25 illustrating the switch mounted in position on a latch housing relative to a ratchet.

DETAILED DESCRIPTION OF THE EMBODIMENTS

Figure 1:
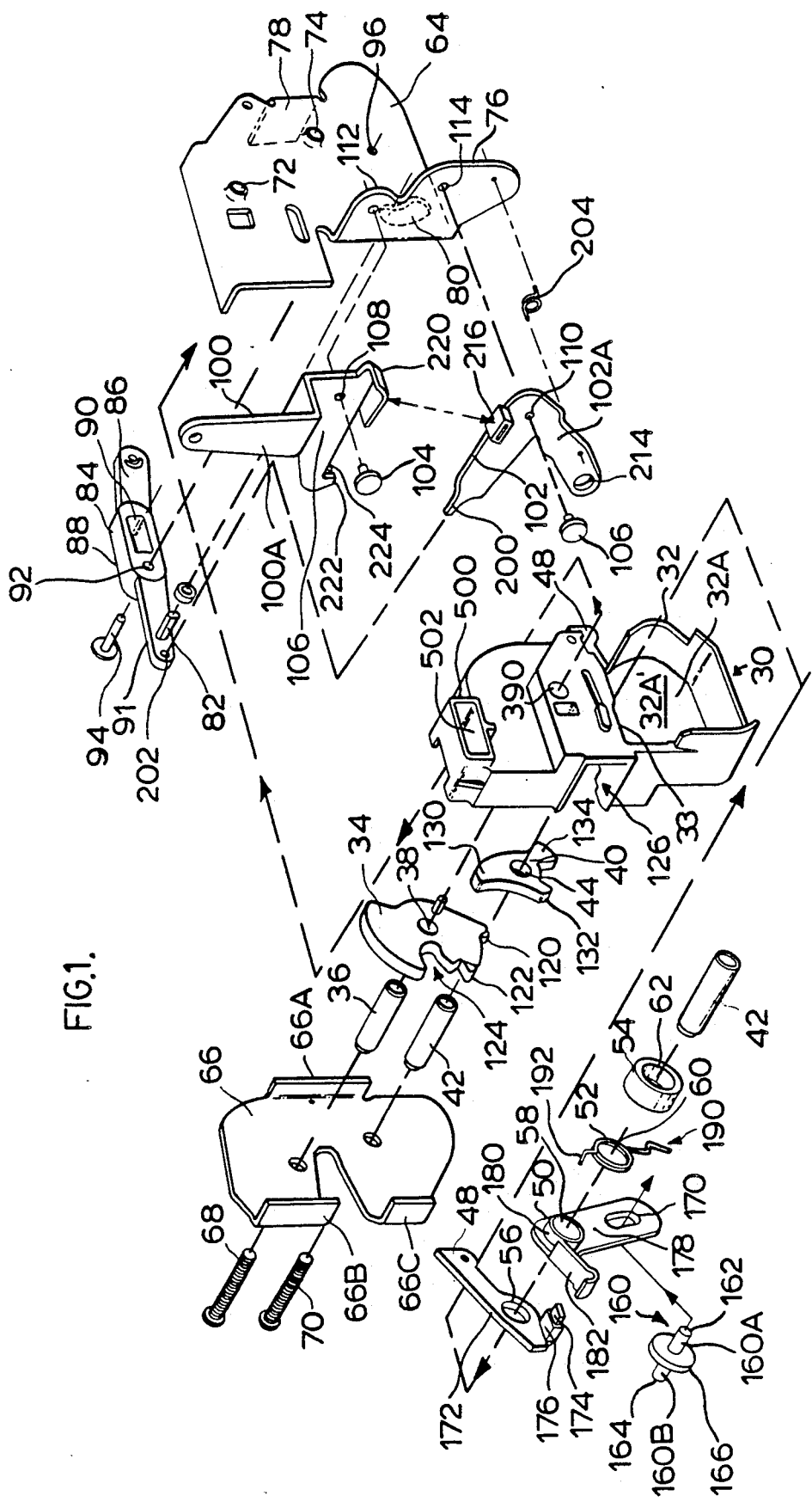
FIG. 1 is an exploded perspective view of an improved latch mechanism constructed according to an embodiment of the invention.
Figure 13:
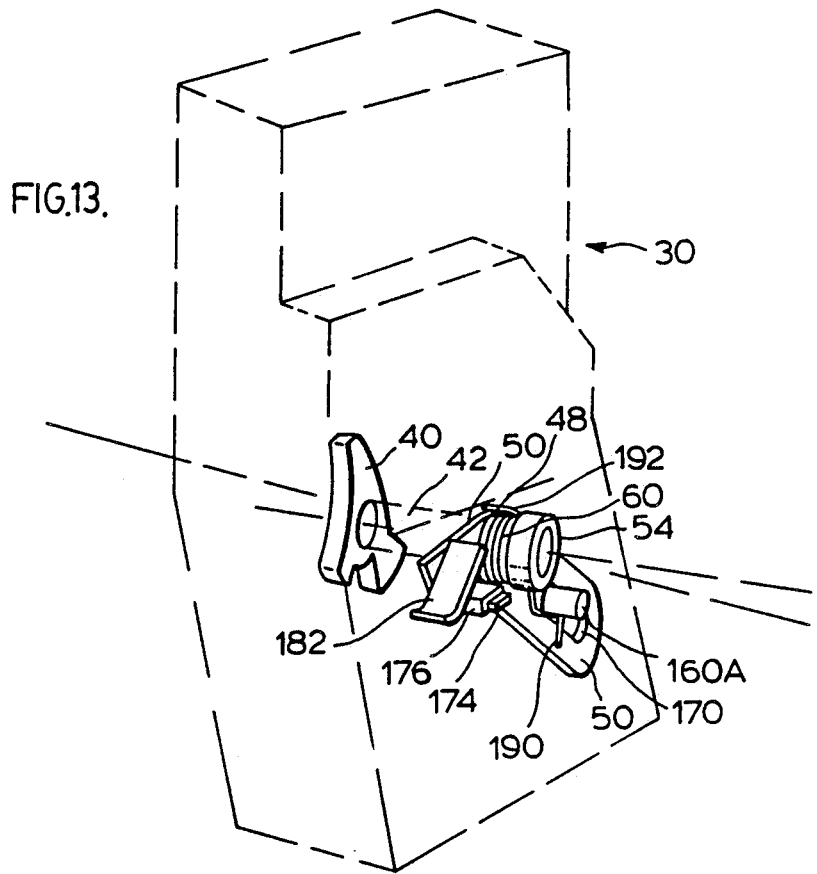
FIG. 13 is a perspective schematic view of a latch mechanism according to an embodiment of the invention after the vehicle in which the latch mechanism was mounted was involved in an accident.
Figure 14:
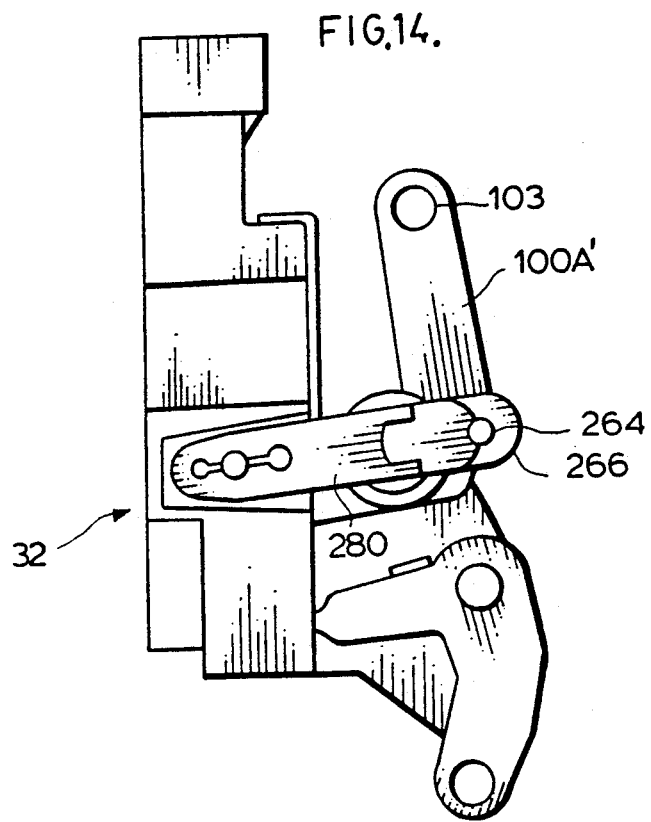
FIG. 14 is a plan view illustrating a latch mechanism carrying a child safety lever according to an embodiment of the invention.
Figure 21:
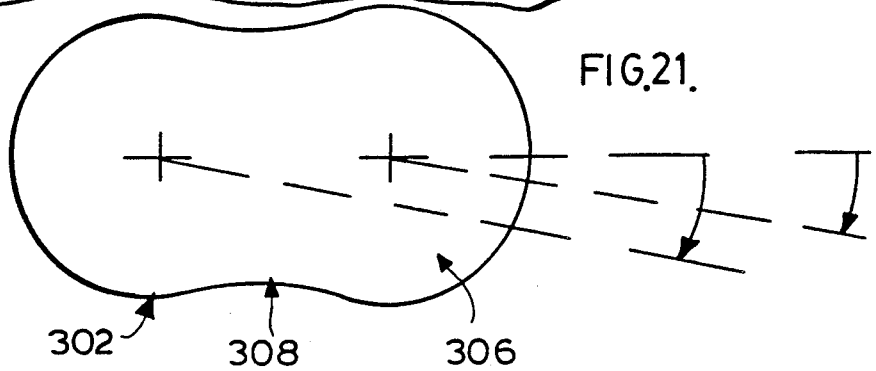
FIGS. 20A and 21 are plan views of the structures of part of the child proof safety lever and an hourglass shaped slot shown in FIG. 20.

With reference to FIGS. 1 through 10 inclusive, there is shown a latch mechanism 30 in exploded perspective view (best shown in FIG. 1) comprising housing 32, one side of which is shown in FIG. 1 and the other side of which is shown in FIG. 7 receiving the components of the latch mechanism 30. Latch mechanism 30 comprises latch housing 32 for mounting ratchet 34 on bushing 36 passing through aperture 38 of ratchet 34, bushing 36 passing through aperture 39 through housing 32, pawl 40 mounted on bushing 42 passing through aperture 44 of pawl 40, bushing 42 also passing through housing 32 at 46 (see FIG. 13), bushing 42 also carrying outside release lever 48, a pivotable intermediate lever 50, torsion spring 52 and interference fit bushing 54 passing through respective apertures 56, 58, 60 and 62 thereof. Housing 32 comprises recess 32A for carrying outside release lever 48, intermediate lever 50, spring 52 and interference bushing 54 carried by bushing 42 which acts as a pivot therefor and a pivot for pawl 40 carried on the other side of housing 32 in recess 32B. Housing 32 is meant to be covered by plate 64 on one side (covering portion 32A) and the other side (recess 32B) covered by cover plate 66. Cover plate 66 carries side flanges 66A, 66B and 66C for closing the latch. Cover plate 66 also carries two apertures for passing therethrough threaded bolts 68 and 70 for passing through bushings 36 and 42 respectively to be secured into threaded recesses 72 and 74 respectively in cover plate 64. Cover plate 64 also carries mounting flange 76 being bent normal from the plane of cover plate 64 and flange 78 recessed from the side edge of plate 64. Curved elongated slot 80 is provided through cover plate 64 for the passing therethrough of projection 82 carried by outside locking lever 84.

Outside locking lever 84 comprises arm 86 angled to central body portion 88 and arm portion 91 on the other side of central portion 88 remote from arm 86. Central portion 88 carries elongated opening 90 therethrough and aperture 92 through which rivet 94 pivotally secures outside locking lever 84 through aperture 96 in cover plate 64. Two levers inside release lever 100 and inside locking lever 102 are pivotally secured by rivets 104 and 106 through apertures 108 and 110 through apertures 112 and 114 in mounting flange 76.

With reference to FIGS. 1 and 7, ratchet 34 is covered by plastics material except at shoulders 120 and 122 (see FIG. 7) on the side of striker receiving recess 124 remote striker receiving opening 126 comprising a generally tapered slot 126 shown best in FIG. 7. Shoulders 120 and 122 are provided for engaging arm 130 of pawl 40. Raised portions 132 and 134 of pawl 40 are provided for abutting wall portion of the recess in which the ratchet 34 and pawl 40 are pivotally mounted as for example, at 140 which is a soft plastics bumper secured to the tough, rigid plastics material of housing 32 for silencing the movement of the pawl 40. Shoulder of pawl 134 engages the end 142 of compression spring 144, riding in groove 146 also for noise reduction purposes when the pawl pivots. With reference to FIG. 7, it is apparent that pawl 40 has been pivotally mounted on bushing 42 for locking the ratchet in the closed position shown in FIG. 7 by abutting shoulder 122 by end 130 proximate the centre line of the striker receiving opening 126 of the pawl. Thus, in an accident, for example, shoulder 122 is urged by the ratchet attempting to rotate to a position aligning recess 124 in alignment with the striker receiving recess 126 to release the striker (not shown) from recess 124. As shoulder 122 does so, it rotates, pushing itself onto the pawl, urging the pawl to rotate towards the striker receiving opening 126 opposite its normal motion, therefore, locking the ratchet more firmly in its closed (locked) position. Thus, a toggle action is set up between the ratchet 34 and pawl 40 for additional safety in an accident, it becoming harder to separate the ratchet from the pawl.

With reference to FIG. 7, slot 150 is shown being a modified side-ways U-shaped slot having height and width, the two arms of the U (best shown in FIGS. 8, 9 and 10 as numbers 152 and 154) separated by divider projection 156 U-shaped slot is provided for receiving the end of "guided floating pin" 160 (shown in FIG. 1 in perspective). Pin 160 comprises two portions, 160A and 160B, having ends 162 and 164 respectively, portions 160A and 160B of guided floating pin 160 spaced by a spacer 166.

With reference to FIGS. 1, 3, 6, 7, 8, 9 and 10, it is clear that end 164 of portion 160B of pin 160 extends through slot 150 in the housing wall 32A' (seen in FIG. 1 and FIG. 6) with spacer 166 abutting wall 32A'. The other portion 160A of pin 160 extends through elongated slot 170 of intermediate lever 50 and into recess or opening 90 in outside locking lever 84 (see FIGS. 1 and 3). Outside release lever 48 carries arm 172 and projection 174 covered by plastic cover 176 extending at right angles to the plane of arm 172. Intermediate lever 50 comprises an elongated arm 178 which carries slot 170 through which end 162 of end portion 160A projects' intermediate lever 50 carries a raised integral wall 180 surrounding aperture 58 and laterally extending hook shaped arm portion 182 for sitting above projection 174 (see FIG. 2). Spring 52 is mounted to surround wall 58, one arm of spring 52 being a modified Z-shape at 190 for engaging portion 160A of pin 160 (see also FIG. 6) to provide two positions whereat portion 160A can sit in the modified Z-shaped arm 190. The other end 192 of torsion spring 52 is provided to abut wall 33 (not shown). Interference bushing 54 is provided so that when bushing 42 extends through aperture 62 of interference fit bushing 54, aperture 60 of spring 52, aperture 58 of intermediate lever 50, and aperture 56 of outside release lever 48, and thereafter is pushed through raised integral sleeve 35 passing through wall 32A' (see FIG. 6) it thereafter passes through aperture 44 of pawl 40, thereby providing a common pivot for the pawl, the release lever 48, and intermediate lever 50 (after being secured by threaded pin or bolt 70 into threaded aperture 74 in cover plate 64). Thus, with reference to FIG. 13, latch mechanism 30 is shown having been involved in an accident resulting in deformation of the latch mechanism and components. However, because pawl 40, outside release lever 48 and intermediate lever 50 are on the same common pivot (bushing 42), it may still be possible to open the latch by the operation of the outside release lever 48 which is secured to the outside handle, thereby assisting to get the occupants out of the vehicle.

Figure 2:
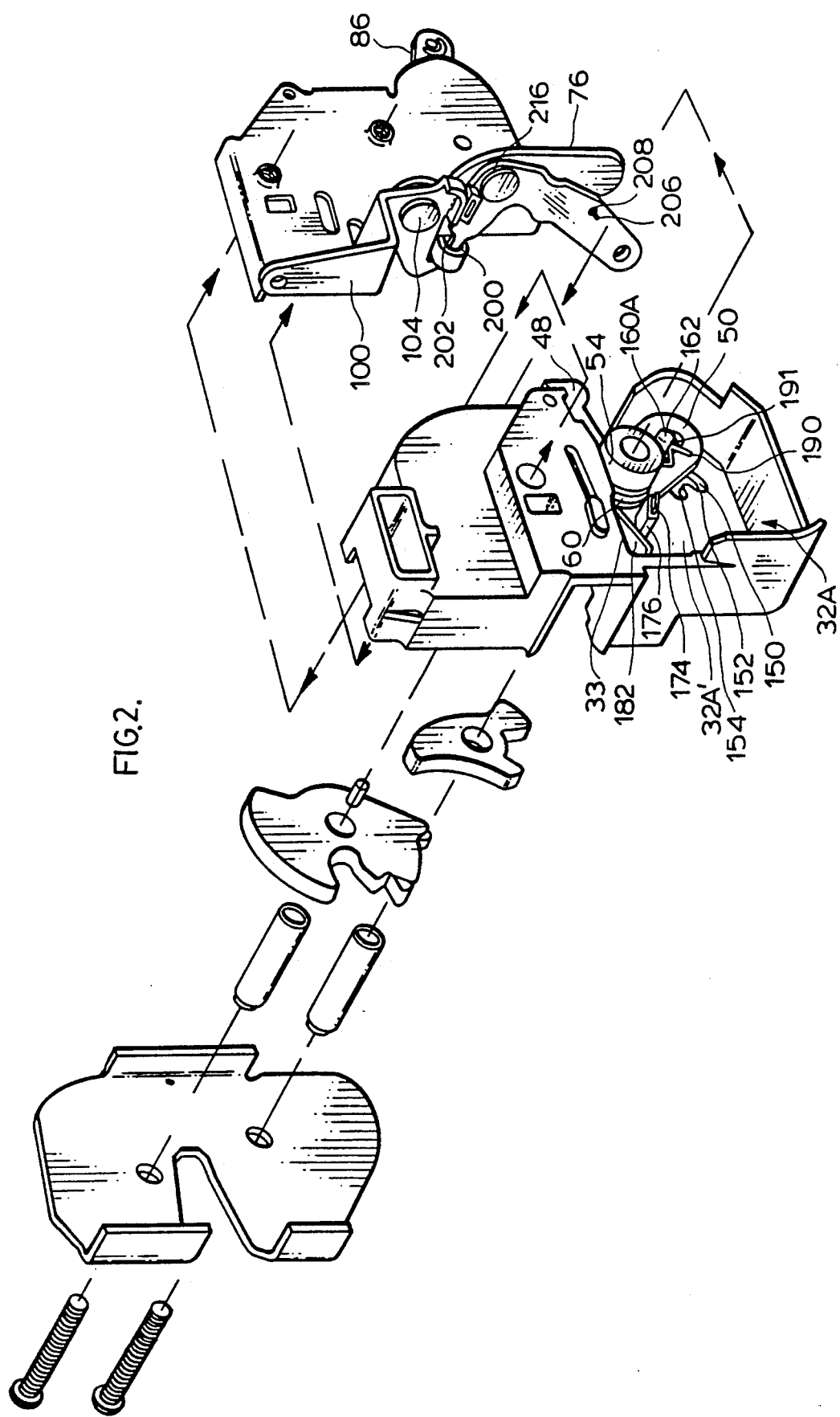
FIG. 2 is a perspective partially exploded view of the exploded latch mechanism shown in FIG. 1, partly assembled.
Figure 8:
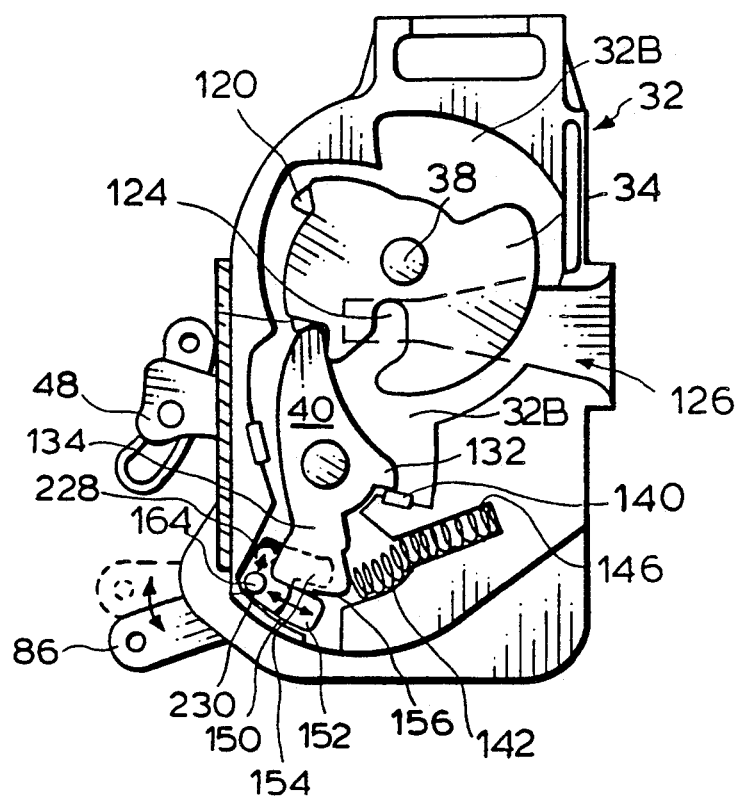
FIGS. 8, 9 and 10 illustrate the operation of components of the latch mechanism shown in FIG. 7.
Figure 9:
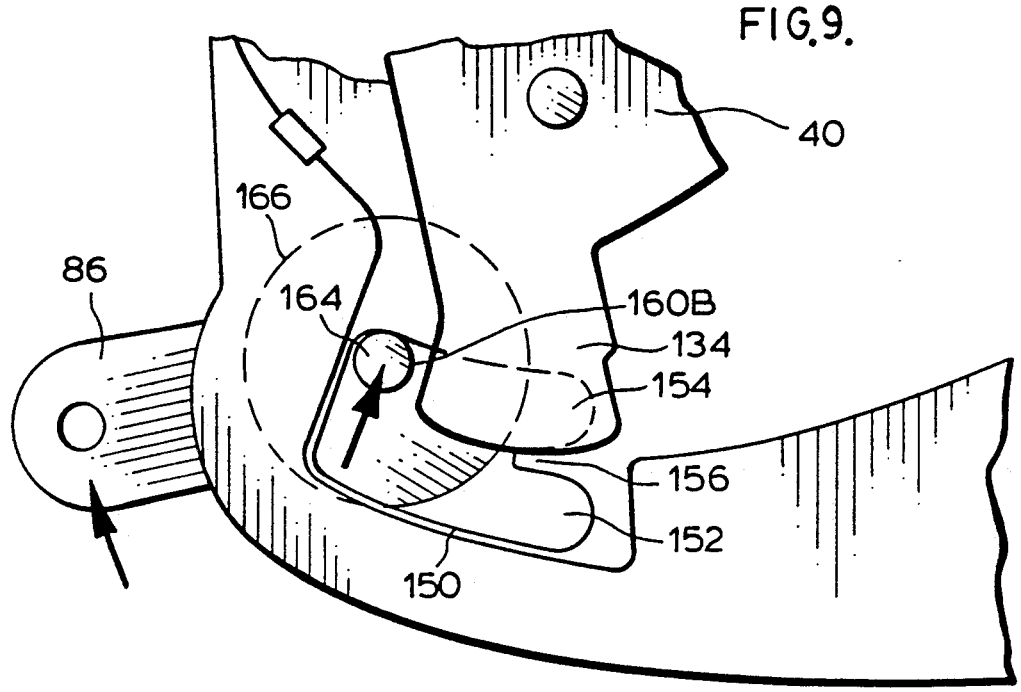
Figure 10:
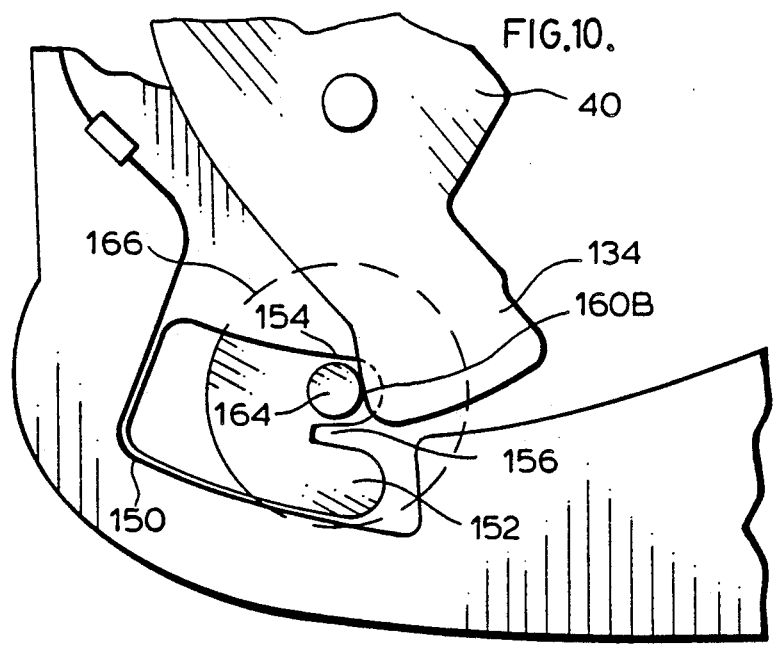

With reference to FIGS. 1, 2, 3, 4 and 5, outside locking lever 84 is secured to inside locking lever with tip 200 of inside locking lever extending into recess or hole 202 of outside locking lever 84 when mounted (see FIGS. 1, 2 and 4). Inside locking lever 102 is generally L-shaped and is mounted at the elbow of the L by rivet 106 extending through aperture 110 into aperture 114 of mounting flange 76. Torsion spring 204 is interposed between arm portion 102A and mounting flange 76 with end 206 of torsion spring 204 extending through aperture 208 and the other end 210 secured through aperture 212 in flange 76. Inside locking lever 102 carries aperture 214 for securing to the locking system. Plastic covered seat 216 is provided against which rocker or shoulder member 220 of inside release lever 100 abuts, thereby engaging inside release lever 100 to inside locking lever 102.

With reference to FIG. 1 and FIG. 5, inside release lever 100 comprises L-shaped arm 100A attached to body plate 101 which carries rocker or shoulder 220 for rocking engagement with seat 216 (see FIG. 4) in use. At the opposite end of plate 101 and extending in the opposite direction as rocker 220 is projection or finger 222 covered by plastic covering 224 for engaging the underside of hook portion 182 of intermediate lever 50 when mounted. In this regard, when cover plate 64 is secured over latch housing 32 so that finger 222 covered by plastic 224 extends into the recess 32A, underlies hook arm 182 which is shown in FIG. 2 and thus either the pivoting of outside release lever 48 (for example, by the outside handle) or the pivoting of the inside release lever on rivet 104 will cause hook arm 182 to be raised. Because lever 50 carries spring 60, the lifting of hook arm 182 by either projection 222 covered in plastic 224 or projection 174 covered by plastic 176 of outside release lever 48. When the release levers 48 and 100 are released, hook arm 182 of intermediate lever 150 returns to its normal position because of the action of spring 60.

With reference to FIG. 1 and FIGS. 7 through 10 inclusive, it is clear that by the pivoting of outside locking lever 84 about pivot 94 secured through aperture 96 of cover plate 64, that the position of spring 160 in slot 150 will be controlled. Furthermore, because outside locking lever 84 is connected to inside locking lever 102, any pivoting of inside locking lever will cause projection 200 in aperture or recess 202 to follow the pivoting of inside locking lever 102 about pivot 106, thereby pivoting outside locking lever 84 about pin 94, thus positioning pin 160 and end 164 in slot 150 between an upper position shown at 228 (see FIG. 8) and lower position 230 (see FIG. 8). It is also clear that if portion 160B and end 164 of pin 160 were to pivot across the width of sideways U-shaped slot 150, when in the raised position as shown at 228, it will engage the bottom of pawl 40 at 134, and push it laterally, thereby releasing the ratchet 34 which has been spring mounted, thus rotating recess 124 carrying a striker to be aligned with striker receiving opening 126. However, when portion 160B is in the lower part of slot 150 aligned with U-arm 152 and if pin portion 160B and end 164 of pin 160 were to move laterally across the width of arm 152 of slot 150, it could not engage portion 134 of pawl 40. Thus, pin 160 can be considered a "guided floating pin" being controlled in its height or position by the pivoting of outside locking lever 84 about pivot 94 and inside locking lever 102 pivoting about pin or rivet 106. Thus, pin 160, pin portion 160B and end 164 are raised and lowered in slot 150 between a lower position and a raised position. The two positions are precisely controlled by the Z-shaped modification to the end portion 190 of spring 60 as shown in FIG. 6 being forced past jog 191 by the pivoting of locking levers 84 and 102.

With reference to FIGS. 1 and 2, and particularly FIG. 2, because intermediate lever 50 pivots about bushing 42 when either release lever (outside release lever 48 or inside release lever 100) causes hook arm 182 to be raised, lever 50 causes pin portion 160A and thus end 162, and pin 160, to rotate with intermediate lever 50, thereby rotating pin portion 160B and end 160 in either the upper portion 154 of the sideways U-shaped slot, or in the lower portion or arm 152 of the sideways U-shaped slot as controlled by modified Z-shaped arm 190 of spring 60. Thus, it is clear that when locking levers 84 and 102 have been pivoted (either by a key cylinder engaging arm 86 of outside locking lever 84 or the locking system inside the vehicle connected by aperture 214 to inside locking lever 102 so that portion 160B is in arm 152 of slot 150) and the outside release lever 48 engaged as for example, by an outside handle, the pawl is not engaged by portion 160B of pin 160 and therefore the door is considered locked. However, even when the pin is in the lower portion or arm 152 of slot 150, the activation of inside release handle 100 will cause rocker 220 to ride down on seat 216 (see FIG. 4), causing pin 200 to be pivoted to position portion 160B of pin 160 in the raised position in arm 154 of slot 150. Thus, the inside release lever is given an "override" capability first locking the lock by appropriately positioning the pin 160 in slot 150 and thereafter, causing finger 222 to raise hook arm portion 182 of intermediate lever 50. As is also apparent, slot 90 in outside locking lever 84 is of such length to accommodate the lateral movement of portion 160A and end 162 in slot 150. As is also apparent, shoulder 120 has been provided on ratchet 34 on the side of first shoulder 122 remote the recess for acting as a backup, being able to engage the pawl before the recess 124 in the ratchet is aligned with the striker receiving opening 126 in housing 32.

Figure 11:
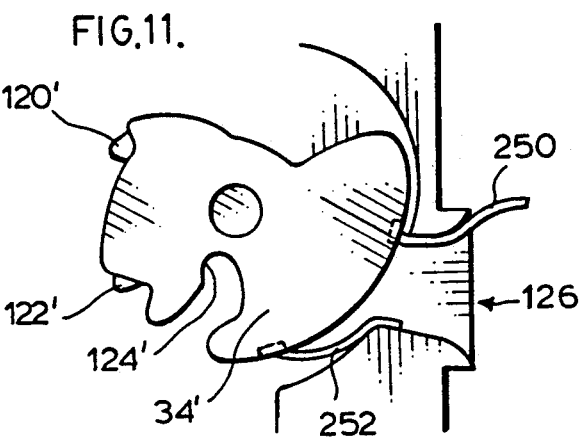
FIGS. 11 and 12 are plan views of a ratchet mounted for operation according to another embodiment of the invention.
Figure 12:
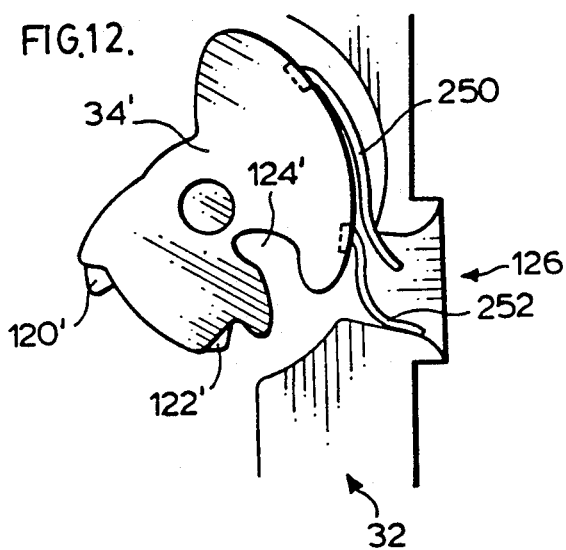

With reference to FIG. 12, there is shown a modified ratchet 34' pivotally secured as ratchet 34 in housing 32 carrying recess 124', shoulders 122' and 120' and a pair of elongated pieces of flexible "Hytrel" plastics material (a soft plastics) shown at 250 and 252. As is apparent in FIG. 11, the two elongated pieces 250 and 252 have been injection moulded onto the ratchet at the same time the cover plastics material has been injection moulded onto the steel or metal ratchet, leaving exposed metal for engagement on shoulders 122' and 120'. As is also apparent from FIG. 11, when comparing with the position of ratchet 34 in FIG. 7 when in the closed or locked position, that ratchet 34' is in the locked position with the striker (not shown) in recess 124'. At that point elongated piece or member 250 closes any opening between the housing 32 and the striker at striker receiving opening at 126 in housing 32. At the same time elongated piece of plastic closes the lower end of striker receiving opening to keep dirt from entering the opening into the mechanism.

With reference to FIG. 12, when the ratchet is released to release the striker (not shown), positioning striker receiving recess 124' of ratchet 34 in alignment with striker receiving opening 126, the elongated pieces of soft plastic rotate with the ratchet about the circumference of ratchet 34', wiping against the walls defining the mouth of the striker receiving opening 126. Therefore, dirt and debris is forced away from the striker receiving opening 126.

Figure 20:
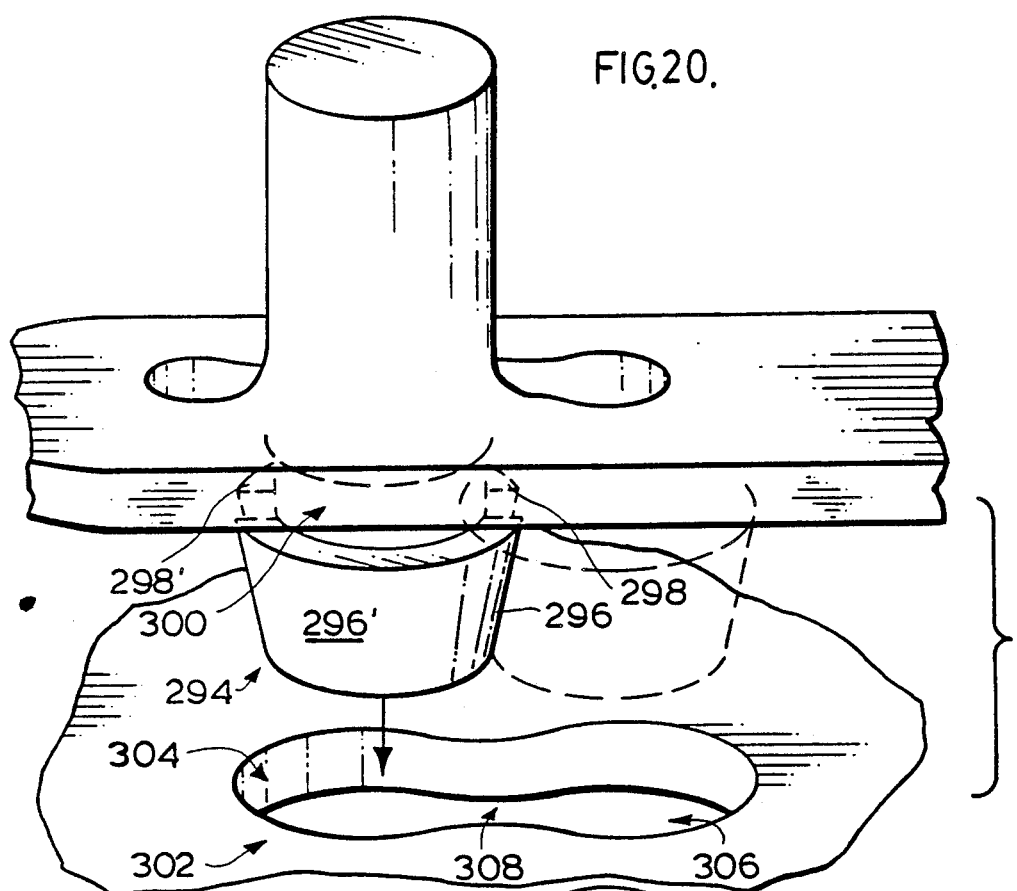
FIG. 20 is a close-up view of part of the child proof safety lever and components of the latch mechanism shown in FIG. 15.
Figure 20A:
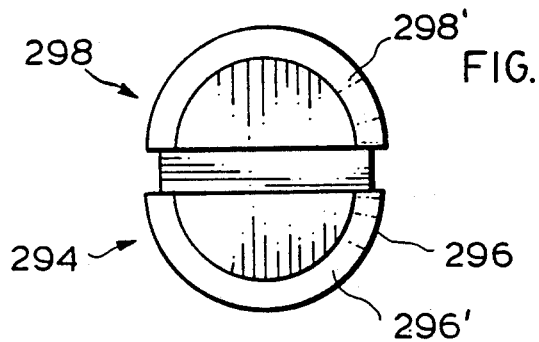

With reference to FIGS. 14 through 21 of the Application, the latch mechanism shown in FIG. 1 has been modified to modify inside release lever 100 to provide two portions 260 and 262 for being operatively connected together (see FIG. 15). Lever 262 now carries finger 222 covered by plastic covering 224. Arm 260 comprising L-shaped handle portion 100A' carrying aperture 103 for being secured to the inside release handle is connected to longitudinally extending portion 264 therebelow, carrying laterally extending elongated slot 266. An aperture is provided in portion 264 and enlarged curved portion 264' for receiving pin 268 for securing through aperture 270 and lever arm 262. Thus, inside release lever comprises portions 260 and 262 pivotally secured together. However, the rotation of one will not effectively cause rotation of the other. It is in this regard that elongated slot 266 has been provided in portion 260 and spaced arms 272 and 274 (arm 272 being larger than arm 274 and overlying arm 274) have been provided. Child proof safety lever 280 (see best in FIG. 15) carries at one end a pin 282 comprising cylindrical portion 284 extending normal to the plane of the body of child proof safety lever 280 and laterally extending flange 286 for insertion through slot 266 and positioning of the end of pin 284 below arm 272 so that lateral movement of child proof safety lever 280 slides pin 282 in slot 266, positioning portion 284 either at one end of slot 266 and thus between arms 272 and 274, or, portion 284 at the other end of slot 266, thereby positioning portion 284 directly below arm 272 (see FIGS. 16 and 17). At the other end of child proof safety lever remote pin 282 is disposed handle 292 for extending from the edge of the door for being used to activate the child proof safety lever by pushing the handle in one direction or another parallel to the extent of the child proof safety lever 280. Child proof safety lever 280 also carries at the end where the handle is disposed, compressible resilient projection 294 seen best in FIG. 20, comprising a pair of spaced fingers 296 and 298, the ends of which two fingers are shown in FIG. 20A to show the spacing of the fingers. Fingers 296 and 298 are resiliently compressible towards one another and carry enlarged resilient portions 296' and 298' to define between enlarged resilient portions 296' and 298' and the body of the child proof safety lever 280, a channel 300 (see FIG. 20). Housing 32 (see FIG. 15) carries an elongated hourglass shaped slot 302 comprising end portions 304 and 306 spaced by a narrower portion 308. Slot 302 receives resilient compressible projection 294 for passage therethrough for permitting the enlarged resilient portions 296' and 298' to engage housing material surrounding the hourglass shaped slot 302 on the other side of the housing against which child proof safety lever 280 abuts. Thus, when projection 292 is in slot portion 306 (in this regard see FIGS. 16 and 17), cylindrical portion 284 is the position in slot 266 remote from arm 274 and the rotation of handle 100A' in the direction of the arrow moves portion 260 to the position shown in FIG. 17 without moving lever 262. When the resilient compressible projection 294 is moved past the narrower portion of the slot 308 (thereby compressing fingers 296 and 298 towards one another, permitting resilient compressible projection 294 to pass by the narrower portion 308 of slot 302 to slot portion 304), portion 284 of pin 282 is positioned in slot 266 as shown in FIGS. 18 and 19 between arms 272 and 274. Thus, the rotation of handle 100A' as shown in FIG. 19 will cause both portions 260 and 262 to move in unison together elevating finger 222 and covered plastic casing 224 to engage hook arm portion 182 of intermediate lever 50, thereby raising arm 182 and pivoting lever about bushing 42, pivoting pin 164 to engage pawl portion 134 for releasing the ratchet. Thus, a simple child proof safety mechanism can be added to a latch mechanism providing for two pivot points for the child proof safety lever 280 in the hourglass shaped slot 302. It is also apparent that flange 286 extending from portion 284 maintains pin portion 284 within slot 266 locking it through the slot when flange 286 is passed through the slot with portion 284.

With reference to FIG. 1, it is apparent that cover plate 64 provides on the side thereof a mounting plate 76 to which the inside release lever 100 (or in another embodiment, 60) and inside locking lever 102 can be pivotally mounted. Thus, it is apparent that the levers are mounted at the edge of the cover plate 64 and will be positioned between the shut surface of the door at the side where the latch is mounted to engage the striker, and the cover plate. In this manner, theft resistance, freeze resistance and contamination resistance of the latch mechanism is effected. The cover plate 64 extends across substantially the back of the housing 32 with the two levers mounted at the edge of the latch mechanism with only slim thin portions of the lever material extending into recess 32A (only material from lever 100 or 260) by requiring only a very slim side opening between the edge of housing 32 and mounting plate 76. Thus it is apparent that the cover plate carries a minimum number of openings for the entry of dirt and debris.

Figure 22:
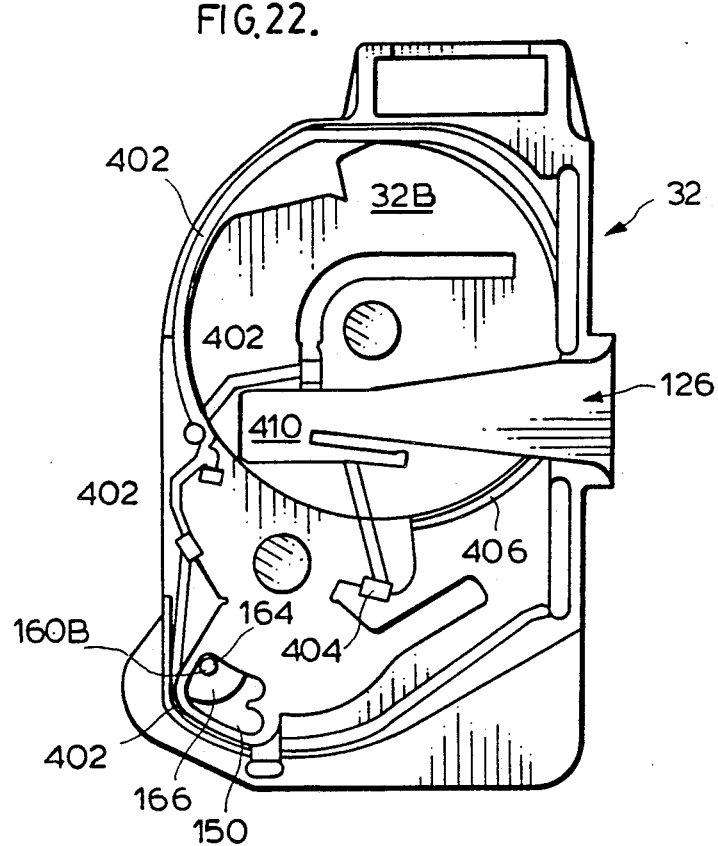
FIG. 22 is a plan view of an injection moulded housing of tough rigid plastics material.
Figure 23:
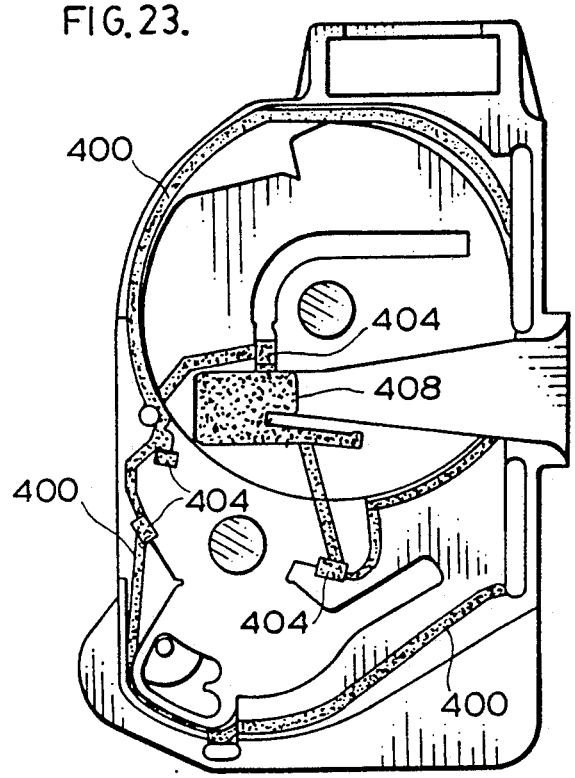
FIG. 23 is a plan view of the housing shown in FIG. 22 to which has been injection moulded at one time, silencers, noise reducers, sealing portions, and bumpers of soft plastics material.

With reference to FIG. 22, there is shown a detailed configuration of the housing 32 which has been injection moulded from an acetal plastics material (for example, Delrin t.m. of Dupont). The portion shown in FIG. 22 is that securing the ratchet and pawl in position clearly displaying slot 150, striker receiving opening 126 tapered towards its rear end and portion 32B in which the ratchet and pawl are mounted for pivotable rotation. The said injection moulded housing 32 also carries recesses into which are injection moulded a softer plastics material shown in stippled line in FIG. 23, which are to comprise silencers, noise reducers, sealing portions, and bumpers (including shock absorbers). In this regard, the addition of the silencers, noise reducers, sealing portions and bumpers has been in a one-step operation which has been diagrammatically illustrated with reference to FIG. 24. Each of the added components in the recesses shown were made at the same time as the others by injection moulding techniques. Thus, raised sealing surface 400 made of softer "Hytrel" plastics has been injection moulded into thin recesses 402 provided in housing 32 before the injection moulded step. Bumpers and silencers have been provided as for example, at 404 injection moulded in recesses 406 and shock absorber has been injection moulded in portion 410 of housing 32 against which the striker may engage.

Figure 24:
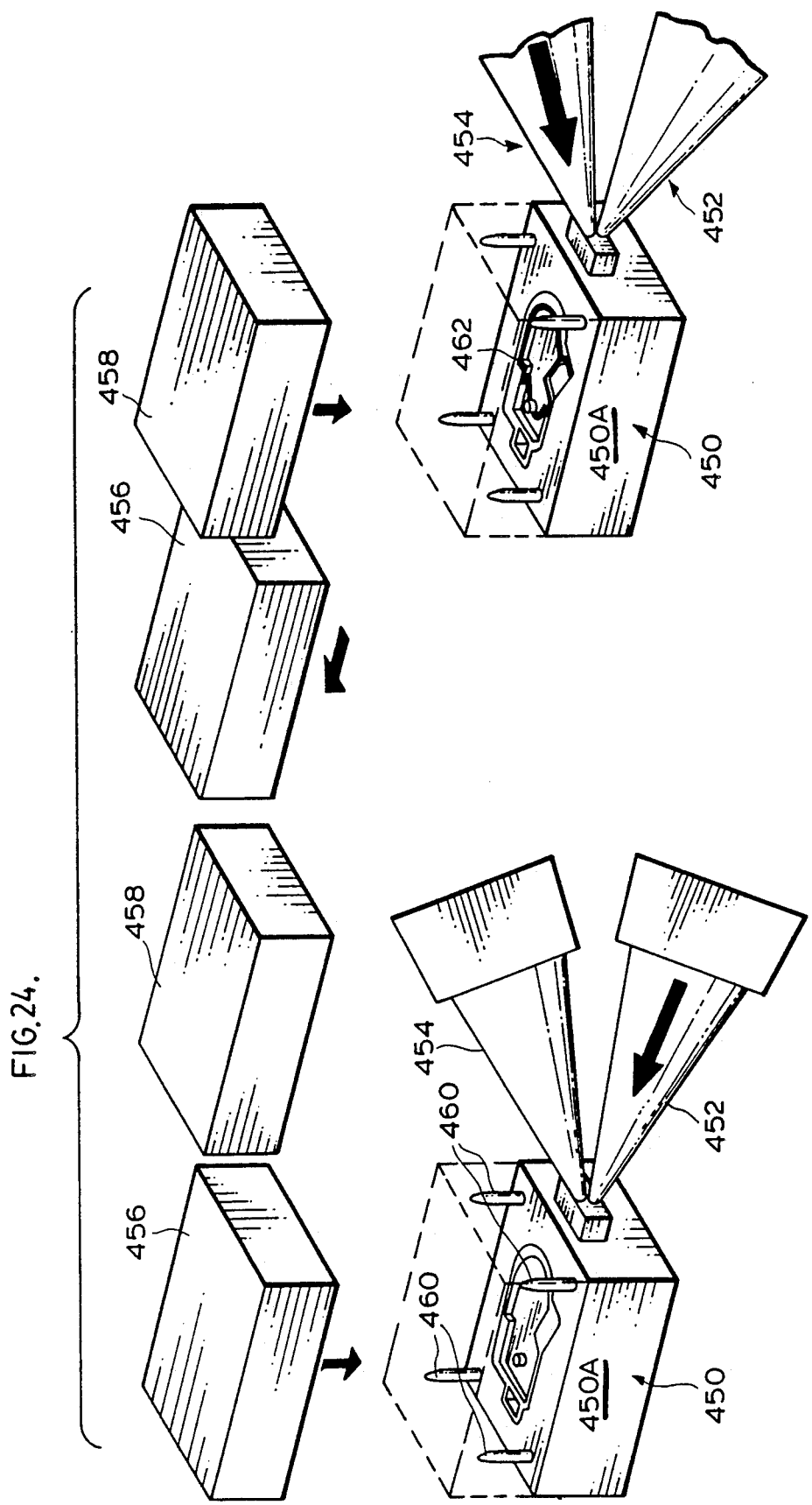
FIG. 24 illustrates schematically the process of injection moulding the housing carrying the silencers, noise reducers, sealing portions and bumpers of FIG. 23.

With reference to FIG. 24 and shown only schematically is a mould 450 having two inlets for material 452 and 454 and two tops 456 and 458 for being carried on posts 460 from a raised position to a position proximate the bottom portion 450A of the mould 450. Mould top 456 is lowered on post 460 to provide a moulding cavity for injection moulding housing 32 of a tough, rigid plastics material introduced through line 452 to produce housing 32 from, for example, Delrin plastics material (an acetal resin). Thereafter, top mould portion 456 is elevated, moved out of the way, and top mould portion 458 is lowered onto the posts 450 onto bottom 450A of mould 450. Top mould portion 458 carries recesses therein defining the area where the silencers, noise reducers, sealing portions and/or bumpers (including shock absorbers) are to be moulded onto the housing and after lowering top 458 onto the base 450A, the plastics material is introduced along a line 454 (the plastics material comprising a softer plastics, for example, "Hytrel", a t.m. of Dupont) and those components are moulded onto the housing, for example, shown in the black line (only schematically shown on the right hand side of FIG. 24 at 462.

Figure 25:
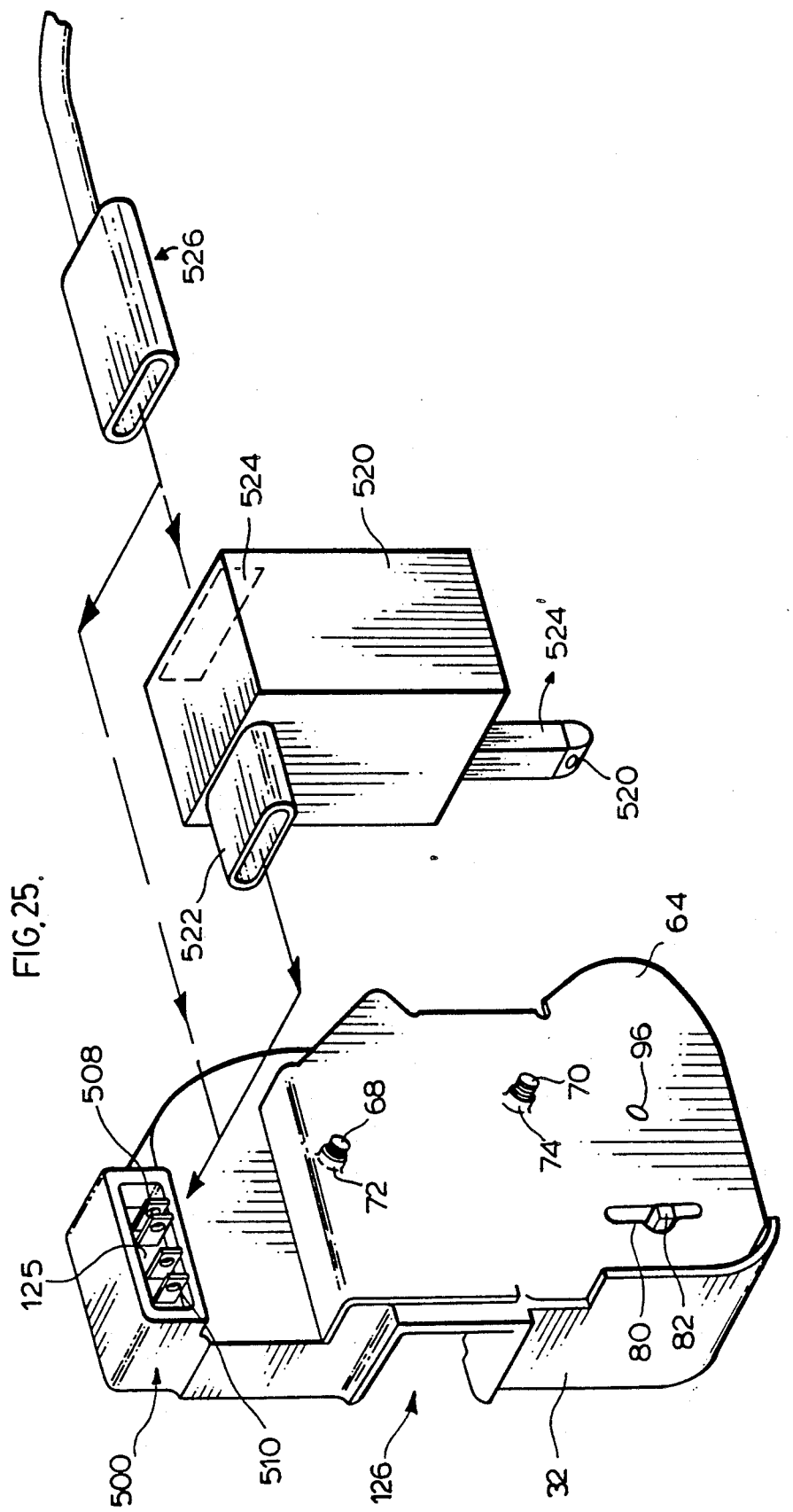
FIG. 25 is a perspective view of a power actuator being electrically connected to a switch carried by a latch mechanism and, to a harness, according to an embodiment of the invention.

With reference to FIGS. 25 and 26, when the housing 32 was injection moulded, an integral mounting receptacle 500 was injection moulded at the top thereof comprising a rectangular casing having an opening 502 therethrough (see FIG. 1). Opening 502 receives electrical switch 504 shown best in FIG. 26 and comprising two pairs of electrical prongs 508 and 510 and two depressible members 512 and 514 depressible into and out of switch 504 for engagement with the circumference of the ratchet 34 as the ratchet rotates within recess 32B. Slot 80 has been provided through cover 64 for passing projection 82 secured outside locking lever 84. Power actuator 520 comprises electrical connector 522 for electrically connecting power actuator 520 to switch 504 and arm 524 carrying aperture 526 for being secured to projection 82 extending through slot 80 in cover 64. Arm 524 is operated by the power actuator to be lifted and lowered thus raising and lowering projection 82 in the slot and thus pivoting arm 84 to position pin 160 in slot 150 for releasing pawl 40. Power actuator 520 also carries a second electrical connector 524 for example, carrying similar connectors to connectors 508 and 510 for electrical connection to electrical harness 526 for being connected to switches, for example, switches connected to displays to display the status of the latch mechanism—open, ajar, closed, etc., the central locking system and switches of the central locking system (power lock). The electrical connections leading from the power actuator at 524 to the electrical harness 526 must include the electrical connections made between the latch mechanism and power actuator for example, between connectors 508 and 510 and connector 522 (and will depend upon the number of functions to be performed or monitored) and the electrical connections from the power actuator (which will also depend upon the number of functions to be performed or monitored). Thus, all the connections between the harness and latch mechanism switch will run through the power actuator, thus requiring only one common wire harness for use to control and/or monitor all possible options for the latch mechanism and power actuator.

With reference to slot 150 and particularly to projection 156, dividing the upper arm 154 from the lower arm 152 of the sideways U-shaped slot 150, projection 156 ensures that if attempts are made at the same time to open the outside handle by activating the outside release lever 48 when the door is locked and the occupant attempts to operate the inside locking lever, pin 160 is not both elevated and moved laterally in slot 150 to engage pawl 40 at 134 and therefore, become lodged on the underside of pawl 40. Therefore, if pin 160 is moved upwardly and laterally at the same time, projection 156 protects the accidental jamming of pin 160 on the underside of pawl 40.

As many changes can be made to the embodiments of the invention without departing from the scope of the invention, it is intended that all matter contained herein be interpreted as illustrative of the invention and not in a limiting sense.

The embodiments of the invention in which an exclusive property or privilege is claimed are as follows:

1. An improved latch mechanism comprising:
   (a) a ratchet carrying a recess for receiving a striker, the ratchet pivotable from an open position for receiving the striker to a closed position;
   (b) a pawl for locking the ratchet in the closed (locked) position;
   (c) at least one release lever and at least one intermediate lever between the release lever and pawl for actuating the pawl for releasing the ratchet to pivot to the open position, the intermediate lever for being engaged by the release lever for actuating the pawl; and
   (d) a locking lever for precluding the at least one release lever and at least one intermediate lever from actuating the pawl, the improvement comprising the pivot point of the pawl and the at least one release lever and the at least one intermediate lever being the same.

2. The improved latch mechanism of claim 1, wherein the pivot for the pawl also carries the at least one release lever and the at least one intermediate lever.

3. An improved latch mechanism comprising:
   (a) a ratchet carrying a recess for receiving a striker, the ratchet pivotable from an open position for receiving the striker to a closed position:
   (b) a pawl for locking the ratchet in the closed (locked) position:
   (c) at least one release lever for releasing the pawl for releasing the ratchet to pivot to the open position: and
   (d) a locking lever for precluding the at least one release lever from releasing the pawl, the improvement comprising the pivot point of the pawl and the at least one release lever being the same.
wherein the at least one release lever comprises an outside handle release lever and inside handle release lever and wherein both the outside handle release lever and inside handle release lever pivot on the same common pivot as the pawl.

4. An improved latch mechanism comprising:
   (a) a ratchet carrying a recess for receiving a striker, the ratchet pivotable from an open position for receiving the striker to a closed position;
   (b) a pawl for locking the ratchet in the closed (locked) position;
   (c) at least two release levers for releasing the pawl for releasing the ratchet to pivot to the open position; and
   (d) a locking lever for precluding the release of the pawl, the at least two release levers being positively connected together.
wherein the at least two release levers are positively connected together accomplished by a means attached to one lever connecting with means attached to the other lever.

5. The improved latch of claim 4, wherein the means positively connecting the at least two release levers being accomplished by a hook attached to one lever connecting with a hook attached to the other lever or a hook of one lever passing through the eye (loop) secured to a bolt or pin on the other lever.

6. An improved latch mechanism comprising:
   (a) a latch housing for mounting a ratchet and pawl having two ends one closer the ratchet and the other end remote from the ratchet, the latch housing carrying a striker receiving opening in the housing and a slot having a predetermined shape proxiamte the end of the pawl remote from the ratchet:
   (b) the ratchet carrying a recess for receiving the striker, the ratchet pivotable from an open position for receiving the striker to a closed position, locking the striker;
   (c) a pawl for locking the ratchet in the closed (locked) position;
   (d) at least one release lever for releasing the pawl for releasing the ratchet to pivot to the open position;
   (e) a locking device for precluding the at least one release lever from releasing the pawl; and
   (f) a pin moveable in the slot having the predetermined shape in the housing, from a position whereat the pin can engage the pawl for releasing the ratchet to a position whereat movement of the pin will not engage the pawl to pivot the pawl for releasing the ratchet.

7. The latch mechanism of claim 6, wherein the pin is movable by a locking device and wherein the slot having the predetermined shape is a U-Shaped slot.

8. An improved latch mechanism comprising:
   (a) a latch housing for mounting a ratchet and pawl and carrying a striker receiving opening in the housing and a slot having a predetermined shape in the housing;
   (b) the ratchet carrying a recess for receiving the striker, the ratchet pivotable from an open position for receiving the striker to a closed position, locking the striker;
   (c) a pawl for locking the ratchet in the closed position (locked position), the end of the pawl remote the ratchet overlying a portion of the slot in the housing;
   (d) at least one release lever for releasing the pawl for releasing the ratchet to pivot to the open position;
   (e) a pivotable intermediate lever operatively engageable by the release lever to cause the intermediate lever to pivot, the intermediate lever carrying a slot permitting a pin to ride therein from one position in the slot to another, the slot overlying a portion of the slot in the housing;
   (f) a locking device for precluding the at least one release lever from releasing the pawl, the locking lever carrying one end of a pin;
   (g) a guided floating pin, one end of which is carried by a locking device and the other end passes through the slot in the intermediate lever through the slot in the housing to a position in the same plane as the pawl to engage the pawl, the pin moveable in the slot by the locking lever from a position whereat movement of the release lever causes the intermediate lever to pivot the pin to engage the pawl releasing the ratchet to a position whereat pivoting of the pin in the intermediate lever will not engage the pawl to pivot the pawl for releasing the ratchet.

9. The latch mechanism of claim 8, wherein the two ends of the pin are spaced by a spacer.

10. An improved latch mechanism comprising:
    (a) a housing comprisng a wall carrying an elongated slot in the shape of an hourglass having two wider portions spaced by a narrower portion;
    (b) a ratchet carrying a recess for receiving a striker, the ratchet pivotable from an open position for receiving the striker to a closed position;

(c) a pawl for locking the ratchet in the closed (locked) position;

(d) at least one release lever for releasing the pawl for releasing the ratchet to pivot to the open position, the release lever comprising two portions pivotally secured together, one portion of the release lever for being connected to the inside release handle and carrying an elongated slot extending generally in the same direction as the hourglass shaped slot and the other portion for releasing the pawl and carrying at least one arm; and (e) a child proof safety lever carrying proximate one end, a pin for extending through the slot in the portion of the release lever for being connected to the inside release handle and for extending proximate the at least one arm of the other portion, and, proximate the other end of the child proof safety lever, a resilient compressible projection for seating in the hourglass shaped slot, the child proof safety lever further comprising means extending therefrom for being used to activate the child proof lever, whereby when the projection is at one end of the hourglass shaped slot it is retained there and the pin extending through the slots is aligned with the at least one arm, operatively connecting the portions of the release lever permitting the release lever to release the pawl, and, when the projection is moved past the narrower portion of the hourglass shaped slot into the wider portion at the other end, it is retained there and the pin extending through the slot is not aligned with the at least one arm and does not operativley connect the portions of the release lever to permit release of the pawl.

11. The latch mechanism of claim 10, wherein the at least one arm comprises a pair of arms and a space therebetween.

12. The latch mechanism of claim 11, wherein one of the pair of arms is shorter than the other arm.

13. The latch mechanism of claim 10, wherein the resilient compressible projection comprises a pair of spaced fingers resiliently compressible towards one another.

14. The latch mechanism of claim 11, wherein the resilient compressible projection comprises a pair of spaced fingers resiliently compressible towards one another.

15. The latch mechanism of claim 12, wherein the resilient compressible projection comprises a pair of spaced fingers resiliently compressible towards one another.

16. The latch mechanism of claim 13, 14 or 15, wherein the ends of the fingers carry enlarged resilient portions or other stop means on the ends of the fingers to secure the fingers through the hourglass shaped slot, by engaging housing material surrounding the hourglass shaped slot on the other side of the slot.

17. An improved latch mechanism comprising:
(a) a latch housing for mounting a ratchet and pawl and carrying a striker receiving opening in the housing;
(b) the ratchet being pivotably mounted and carrying a recess for receiving the striker, the ratchet pivotable from an open position with the recess aligned with the striker receiving opening in the housing for receiving the striker to a closed position with the recess spaced from the striker receiving opening;

(c) a pawl pivotably mounted for locking the ratchet in the closed (locked) position, the ratchet carrying a shoulder (or other stop) on the ratchet proximate the recess for being engaged by the pawl proximate the centreline of the striker receiving opening when the ratchet is in the closed (locked) position, the shoulder or stop being on the side of the recess remote the striker receiving opening in the housing, the shoulder (or other stop) when urged by the ratchet attempting to rotate to position the recess in alignment with the striker receiving opening to release the striker without normal activation of the pawl (by for example releasing a release lever to release the pawl as when opening a door), as for example in an accident, the shoulder rotates pushing itself onto the pawl urging the pawl to rotate towards the striker receiving opening (opposite its normal motion when activated to release the ratchet—the portion normally engaging the ratchet and locking the ratchet in the closed postion normally moving away from the striker receiving opening) therefore locking the ratchet more firmly in its closed locked position.

18. The latch mechanism of claim 17, wherein a toggle action is thus set up between the ratchet and pawl for additional safety in accidents becoming harder to separate the ratchet from the pawl.

19. The latch mechanism of claim 17, wherein a second shoulder (or stop) is provided on the ratchet on the side of the first shoulder remote the recess for acting as a back-up, being able to engage the pawl before the recess in the ratchet is aligned with the striker receiving opening in the housing.

20. The latch mechanism of claim 18, wherein a second shoulder (or stop) is provided on the ratchet on the side of the first shoulder remote the recess for acting as a back-up, being able to engage the pawl before the recess in the ratchet is aligned with the striker receiving opening in housing.

21. A latch mechanism comprising a housing, cover plate ratchet, pawl and latch levers, the latch mechanism comprising two chambers separated by a wall, one of the chambers carrying the ratchet and pawl and the other chamber carrying the latch levers, the latch mechanism being mounted to a door in such a manner that the chamber in which the latch levers are carried, is covered by a cover plate proximate the shut surface of the door, ( the side where the latch is mounted to engage the striker) and, the chamber in which the pawl and ratchet are carried is covered thereby improving theft resistance, freeze resistance and contamination resistance of the latch mechanism and thereby providing a latch mechanism having a cover plate carrying a minimum number of openings.

22. The combination of a latch mechanism and power actuator, the latch mechanism carrying a mounting or casing for receiving an electrical switch for sensing the operation of the ratchet and/or its position, or the pawl and/or its position, or both, the power actuator carrying an electrical connector for connecting the power actuator to the electrical switch carried in the casing of the latch mechanism, the power actuator carrying a second electrical connector for being electrically connected to an electrical harness for being connected to the switches (for example, connected to displays to display the status or the latch mechanism—open, ajar, closed, etc.), central locking system and switches of the central locking system (power lock) whereby electrical connection of the latch mechanism switches is made through the power actuator to the electrical harness.

23. The combination of claim 22, wherein the electrical connections leading from the power actuator to the electrical harness include the electrical connections made between the latch mechanism and power actuator and the electrical connections from the power actuator, thus ensuring that all the connections between the harness and latch mechanism switch run through the power actuator thus providing one common wire harness for use to control and/or monitor all possible options.

* * * * *